(12) United States Patent
Thiemann-Handler et al.

(10) Patent No.: US 9,608,301 B2
(45) Date of Patent: Mar. 28, 2017

(54) ELECTROCHEMICAL ENERGY STORE

(75) Inventors: Sabine Thiemann-Handler, Stuttgart (DE); Martin Holger Koenigsmann, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 1442 days.

(21) Appl. No.: 12/600,780

(22) PCT Filed: May 15, 2008

(86) PCT No.: PCT/EP2008/055975
§ 371 (c)(1),
(2), (4) Date: Apr. 23, 2010

(87) PCT Pub. No.: WO2008/141999
PCT Pub. Date: Nov. 27, 2008

(65) Prior Publication Data
US 2010/0203397 A1    Aug. 12, 2010

(30) Foreign Application Priority Data
May 23, 2007  (DE) .......................... 10 2007 023 895

(51) Int. Cl.
| H01M 10/052 | (2010.01) |
| H01M 12/04 | (2006.01) |
| H01M 10/058 | (2010.01) |
| H01M 12/08 | (2006.01) |
| H01M 14/00 | (2006.01) |

(52) U.S. Cl.
CPC ......... H01M 12/04 (2013.01); H01M 10/052 (2013.01); H01M 10/058 (2013.01); H01M 12/08 (2013.01); H01M 14/00 (2013.01); *Y02E 60/122* (2013.01)

(58) Field of Classification Search
CPC .. H01M 10/052; H01M 10/058; H01M 12/04; H01M 12/08; Y02E 60/122
USPC .................. 429/403, 402, 407, 91
See application file for complete search history.

(56) References Cited

U.S. PATENT DOCUMENTS

| 3,330,701 A | | 7/1967 | McElhill | |
| 4,246,324 A | * | 1/1981 | de Nora et al. | 429/406 |
| 5,733,677 A | * | 3/1998 | Golovin et al. | 429/407 |
| 6,094,033 A | * | 7/2000 | Ding et al. | 320/132 |
| 2004/0137292 A1 | * | 7/2004 | Takebe et al. | 429/23 |

(Continued)

FOREIGN PATENT DOCUMENTS

| DE | 1771803 | | 3/1972 |
| DE | 195 37 683 | * | 4/1997 |

(Continued)

OTHER PUBLICATIONS

International Search Report, PCT International Patent Application No. PCT/EP2008/055975, dated Nov. 25, 2008.

(Continued)

*Primary Examiner* — Basia Ridley
*Assistant Examiner* — Heng Chan
(74) *Attorney, Agent, or Firm* — Gerard Messina

(57) ABSTRACT

An electrochemical energy store including at least one anode and at least one cathode in an electrolyte, lithium peroxide being generated at the cathode by the reaction of lithium ions with oxygen. The cathode is connected to an oxygen reservoir.

20 Claims, 2 Drawing Sheets

(56) References Cited

U.S. PATENT DOCUMENTS

2005/0175877 A1* 8/2005 Hong ................ H01M 2/0275
429/406

FOREIGN PATENT DOCUMENTS

| JP | 61-230277 | 10/1986 |
|----|-----------|---------|
| JP | 5-51202 | 3/1993 |
| JP | 9-50820 | 2/1997 |
| WO | WO 9714190 | 4/1997 |
| WO | WO 01/39291 | 5/2001 |
| WO | WO 03/063272 | 7/2003 |

OTHER PUBLICATIONS

Abraham, K.M. et al: "A Power Electrolyte-Based Rechargeable Lithium/Oxygen Battery" Journal of the Electrochemical Society, Electrochemical Society. Manchester, New Hampshire, US Bd. 143, Nr. 1, Jan. 1, 1996, pp. 1-5, XP000556204, ISSN: 0013-4651, S.1: "Experimental" bis. S.3, Fig.3.
J. Electrochem. Society, Bd. 149, Nr. 9, Jul. 29, 2002, pp. A1190-A1195, XP002495473, P.A1190: "Experimental: Cell construction and testing".
T. Ogasawara et al.: "Rechargeable Li2O2 electrode for lithium batteries" J. Am. Chem. Soc., Bd. 128, 1, May 1, 2006, pp. 1390-1393, XP002495474 in the application p. 1391, col. 1, lines 2-8.

* cited by examiner

ELECTROCHEMICAL ENERGY STORE

FIELD OF THE INVENTION

The present invention relates to an electrical energy store.

BACKGROUND INFORMATION

Lithium ion storage batteries are used these days so as to achieve high energy densities. As high energy storage batteries, these have energy densities up to about 200 Ah/kg. As high power storage batteries, energy densities up to about 100 Ah/kg are achieved.

The energy density of lithium ion storage batteries used today is not sufficient, however, especially for applications in electric and hybrid vehicles. Using today's technology that is based on intercalation cathodes and intercalation anodes, also only a slow increase in energy density is made possible. This may be attributed to the fact that the intercalation cathodes supply only one-half of the energy density of the anode. For this reason, new concepts are being sought that permit an increase in the energy density of lithium ion storage batteries.

T. Ogasawara et al., "Rechargeable $Li_2O_2$ Electrode for Lithium Batteries", J. Am. Chem. Soc., 2006, 128, pages 1390 to 1393, describes a porous electrode on which lithium reacts directly with oxygen from the air. Using such an oxygen cathode, one is able to achieve 5 to 10 times as high an energy density as with the usual lithium ion storage batteries, which use an intercalation cathode. In order to be able to absorb oxygen and to release it again, it is necessary, however, for the electrochemical cell to be open. On the other hand, however, it must be prevented that water or carbon dioxide from the air get into the cell, since these compounds may lead to side reactions there, which may decisively reduce the power output and the service life or may make the lithium anode unusable. In addition, such side reactions may proceed explosively. In order to prevent water or carbon dioxide from getting to the anode, conventionally, for example, one may use a ceramic diaphragm which prevents moisture or foreign gases from getting to the anode. Using such a diaphragm does not, however, exclude the reaction of the electrolyte with water, and in addition, the mechanical stability of the diaphragm could be a problem. Thus, for example, hydrofluoric acid is formed in the electrolyte by the reaction of $LiPF_6$ with water, which leads to various ageing mechanisms by attacking electrodes, for example.

SUMMARY

According to an example embodiment of the present invention, an electrochemical energy store is provided which includes at least one anode and at least one cathode in an electrolyte solution, lithium peroxide ($Li_2O_2$) being formed at the cathode. The cathode is connected to an oxygen reservoir, according to the example embodiment of the present invention. An advantage of the oxygen reservoir is that it is not necessary to design the electrochemical cell to be open toward the environment. No oxygen is required from the air. It is thereby possible to use oxygen that is free from contamination, for instance, by water or carbon dioxide. Undesired side reaction at the electrodes are avoided.

In order to provide a sufficiently large reaction surface, the cathode is porous, in one preferred specific embodiment. In this connection, it is preferred if the cathode forms a sufficiently great reaction space for the volume work during charging and discharging. Lithium peroxide is decomposed during charging of the electrochemical energy store, and is formed during discharging.

In one preferred specific embodiment, the cathode includes a lattice structure which has a carrier material as the reaction surface. The lattice structure is preferably produced from a metal. Suitable metals are aluminum, copper, nickel, iron, vanadium and alloys of these metals, for example. Furthermore, graphite and other conductive carbon compounds, or conductive organic polymers are also suitable. The lattice material is preferably used as a current diverter at the same time.

The carrier material also preferably includes a conductive material. This may be graphite, for example. In order to apply the graphite onto the lattice structure, it may be dispersed in a binding agent, for instance, in a fluorinated copolymer or latex. A suitable fluorinated copolymer is PVdF, for example. Moreover, additional additives and catalysts are also preferably included in the binding agent. As catalyst, electrolytic manganese dioxide (EMD) is used, for example.

The cathode is connected to an oxygen reservoir, according to the present invention. In one first specific embodiment, the oxygen is chemically bound in the oxygen reservoir in the form of an oxygen-containing compound. In an alternative specific embodiment, the oxygen contained in the oxygen reservoir is stored physically. By storing the oxygen in the oxygen reservoir, it is ensured that the oxygen required for the cathode reaction is not contaminated by water or carbon dioxide.

If the oxygen is bound chemically in the form of an oxygen containing compound, the oxygen reservoir preferably surrounds the cathode. The storing of the oxygen takes place, in this instance, in the form of an oxide which easily releases the oxygen, for example. Alternatively, it is also possible to use metalloporphyrin or other biomimetic compounds as an oxygen reservoir. It is only important, in this instance, that the oxygen is able to be released easily to the cathode in order to make possible the reaction of lithium ions, which are transported through the electrolyte from the anode side to the cathode, to form lithium peroxide with the oxygen.

If the oxygen contained in the oxygen reservoir is stored physically, it is contained, for example, in an oxygen tank or adsorbed in a storage medium. The oxygen tank in this context is preferably a pressure container, in which the oxygen is contained under pressure. Alternatively it is also possible for the oxygen reservoir to be a gas chamber within the electrochemical energy store. The gas chamber, in this case, is separated by the cathode from the anode, the separator and the electrolyte. The gas chamber should be sufficiently large, in this context, to provide sufficient oxygen for a charge and discharge cycle. The oxygen reservoir is preferably connected to the cathode via a valve. In this case, the oxygen reservoir is preferably the pressure container. By using the pressure container, the volume of the cell may be considerably reduced, since no space for the gas chamber has to be provided for the gas chamber within the cell. The supply or the removal of the oxygen from the porous cathode takes place via the valve.

Even if the oxygen is bound adsorptively in a storage medium, it is possible, on the one hand, that the oxygen is supplied to or removed from the cathode via a valve, so as to regulate the oxygen supply, or so that oxygen reservoir, in which the oxygen is adsorptively stored, directly follows the cathode.

Besides providing pure oxygen, it is also possible for the oxygen reservoir to contain a mixture of oxygen and at least one gas that is inert to the electrochemical reaction. The inert gas is usually nitrogen. Because of the use of the mixture of nitrogen and oxygen, the safety during the operation of the electrochemical energy store is increased, since such a mixture is less reactive than pure oxygen.

The charging and discharging of the electrochemical energy store takes place according to the following reaction equation:

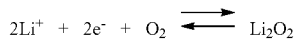

This principle may be applied by various designs of the electrochemical energy store. Thus, for example, systems may be used that have liquid, solid or gel electrolytes.

In systems having liquid electrolytes, an electrolyte is preferably used in which at least one lithium salt is dissolved in an organic solvent. $LiPF_6$, $LiAsF_6$ or LiBOB (lithium bis-oxalatoborate) are suitable lithium salts. These lithium salts may be used in combination with various organic solvents. Carbonates or ether are suitable organic solvents.

In lithium ion storage batteries having solid electrolytes, so-called lithium polymer batteries, the electrolyte is simultaneously also used as separator. The solid electrolyte is generally a polyether, polyethylene oxide or polyproylene oxide together with a dissolved lithium salt, the lithium salt preferably containing a large anion. The advantage of the solid electrolyte is that, generally in contrast to liquid electrolytes, it is not combustible, and the battery consequently has greater operating safety. The conductivity of solid electrolytes may be improved, for example, by dispensing ceramic powder or silicon dioxide vapor in the polymer, whereby there is created a nanocomposite as polymer electrolyte having an improved conductivity. The conductivity may be improved also by using polyvinylidene fluoride as matrix polymer.

Just as with solid electrolytes, a polymer matrix forms the base also in the case of gel electrolytes. This is swelled up by the addition of a liquid electrolyte. The gel electrolyte thereby combines the advantages of a liquid electrolyte, namely, its better ion conductivity, and a solid electrolyte, namely, the greater safety in operation. Suitable polymers are, for instance, polyethylene oxide, polyacrylonitrile, polymethylmethacrylate and polyvinylidene fluoride, as well as a copolymer of polyvinylidene fluoride and hexafluoropropylene. Further increased safety may be achieved by impregnating the microporous diaphragm with a gel polymer.

Suitable anodes contain metallic lithium.

A separator is usually inserted between the anode and the cathode. This is generally a diaphragm that is permeable to either the electrolyte or at least to the anions or the cations from the electrolyte. Suitable materials for the separator are, for instance, polypropylene, polyethylene, hydrocarbons that are fluorinated or coated with ceramics, fiberglass or materials based on cellulose. However, any number of other materials may be used for the separator, which are conventional in lithium ion storage batteries.

To achieve a greater energy density, it is usual to construct a module of a plurality of individual cells, each individual cell in each case containing at least one cathode and at least one anode. In such a module made up of a plurality of individual cells, it is possible, on the one hand, that each individual cell is connected to an oxygen reservoir. It is preferred, however, that in each case at least two cells be connected to a common oxygen reservoir. In particular, it is preferred that all individual cells have a common oxygen reservoir. The oxygen reservoir is preferably connected to the individual cells via valves, in this context. The oxygen supply to the cathode is controlled, in this instance, by a control system. This particularly regulates the oxygen supply to, or removal from the individual cells via valves. The control system, in this instance, may be connected to a battery management system of the module, for example. In this way, for example, one may ascertain, via functional parameters of the individual cells, such as the pressure or the chemical potential of the oxygen in the chemical compound, in connection with the cell voltage, the charge state and the SOH (state of health) of the individual cells, In this way, the battery management system is able to regulate the module as well as possible and, provided it is connected to the control system for the valves, is also able to control the supply and the removal of oxygen, in order to regulate the module. Such a regulation is not possible in the case of other types of battery because of the method of construction using an oxygen reservoir which is connected via valves to the individual cells of the module.

BRIEF DESCRIPTION OF THE DRAWINGS

Specific example embodiments of the present invention are illustrated in the figures and explained in greater detail below.

DETAILED DESCRIPTION OF EXAMPLE EMBODIMENTS

Figure 1:
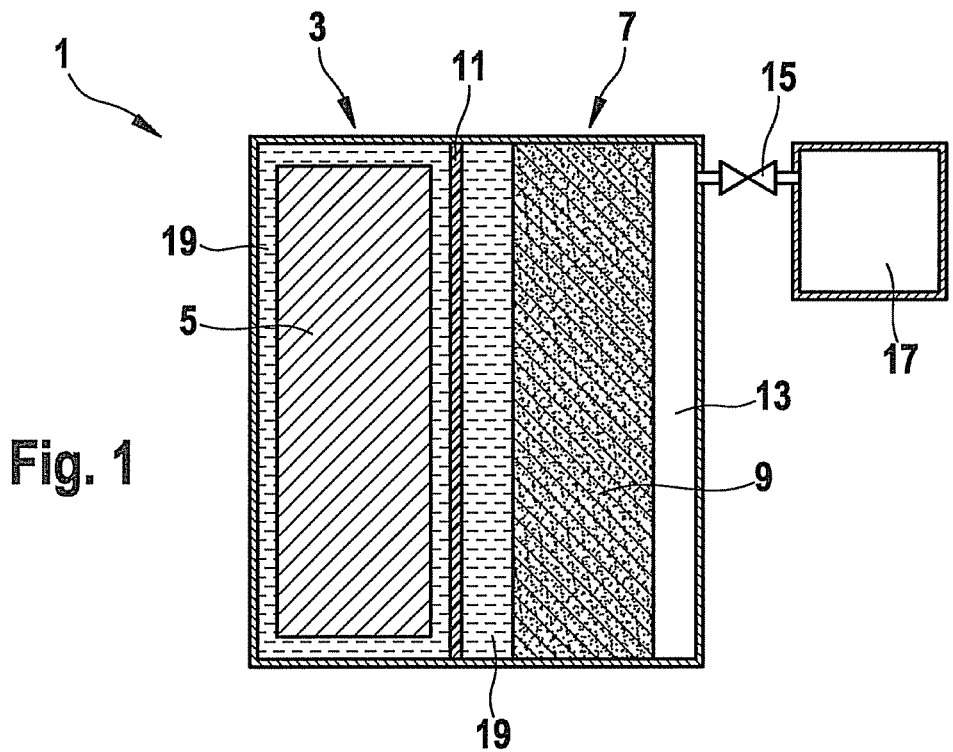
FIG. 1 shows a schematic representation of an electrochemical energy store, according to an example embodiment of the present invention, for liquid electrolyte.

FIG. 1 shows a schematic representation of an electrochemical energy store, according to the present invention, having a liquid electrolyte.

An electrochemical energy store 1 includes a first chamber 3, in which an anode 5 is included. Anode 5 is an anode, in this instance, that is customary for lithium ion storage batteries, for example. A suitable anode 5 includes an intercalation connection based on graphite, a tin-containing and/or silicon-containing alloy or metallic lithium.

Electrochemical energy store 1 further includes a second chamber 7 in which a cathode 9 is accommodated. In order to provide a sufficiently large reaction space for the reaction of lithium with oxygen to form lithium peroxide, cathode 9 is preferably porous. A suitable cathode includes, for instance, a lattice structure which has a carrier material as reaction surface. For its production, a carrier material is applied, for example, as the reaction surface for the cathode reaction, to a metal net or a metal lattice, which acts simultaneously as a current diverter. The carrier material as reaction surface is, for instance, graphite having a binding agent, for example, fluorinated copolymers, such as PVdF or latex. Furthermore, the carrier material may contain additives and/or catalysts, such as EMD (electrolytic manganese dioxide). The metal net is an aluminum net, for example.

First chamber 3 and second chamber 7 are separated from each other by a separator 11. Separator 11 is a semipermeable membrane, for example. Suitable materials for the separator are, for instance, polypropylene, polyethylene, fluorinated hydrocarbons, hydrocarbons coated with ceramics, fiberglass, materials based on cellulose or mixtures of the materials named.

Moreover, a gas chamber 13 is contained, in second chamber 7, in which oxygen may be stored, for instance. Gas chamber 13 is also usually used as the reaction chamber for the reaction of lithium with oxygen to form lithium peroxide. In the specific embodiment shown here, gas chamber 13 is connected to an oxygen reservoir 17 via a valve 15. A customary oxygen reservoir is suitable as oxygen reservoir 17. This may involve, for instance, a chemical or a physical oxygen reservoir. In the case of a chemical oxygen reservoir 17, as was described above, the oxygen is stored in the form of an oxygen-containing compound, such as an oxide, which easily releases oxygen. In the case of physical storage, oxygen reservoir 17 may be a pressure container, for example. Alternatively, it is also possible for the oxygen to be adsorbed in a storage medium.

Suitable oxides for the chemical storage of oxygen are, for example, $Li_2O$, $MgO$, $FeO$, $Fe_2O_3$, $TiO_2$, $V_2O_5$, $Mn_2O_4$, $MnO_4^-$, $Nb_2O_5$. Alternatively, it is also possible to use metalloporphyrin or other biomimetic compounds as an oxygen reservoir.

As the adsorbing agent on which the oxygen is adsorbed, perlite, activated carbon or zeolites are suitable.

If the oxygen is stored chemically or adsorbed on a storage medium, it is preferred if the oxygen reservoir is included in gas chamber 13. When an oxygen reservoir 17 is used, in which the oxygen is stored under pressure, for instance, it is preferred if oxygen reservoir 17 is connected to gas chamber 13 via valve 15.

When a liquid electrolyte is used, an electrolyte 19 is also contained in first chamber 3, next to anode 5. Electrolyte 19 encloses anode 5, so that the latter dips into electrolyte 19. In order to be able to generate a current flow, it is necessary for electrolyte 19 also to be contained in second chamber 7. The electrolyte is located, in this context, between cathode 9 and separator 11. Usually, separator 11 is also saturated with electrolyte 19.

In the specific embodiment shown here, cathode 9 is used simultaneously as separator, in order to avoid that electrolyte 19 gets into gas chamber 13.

However, electrolyte 19 should penetrate into cathode 9, so that the necessary reaction is able to run within the cathode.

Figure 2:
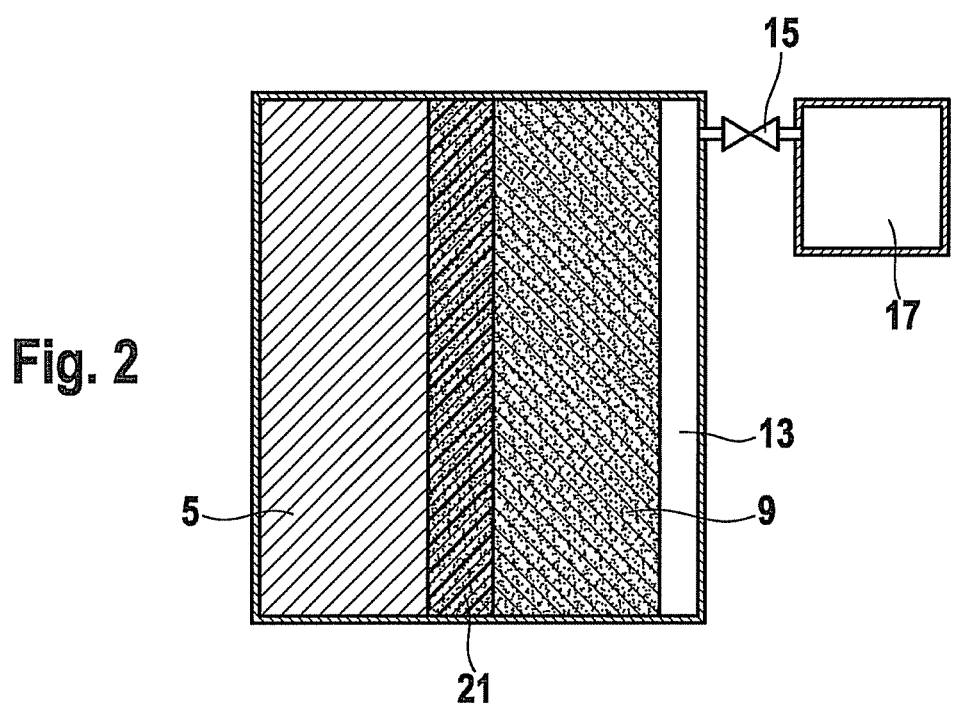
FIG. 2 shows a schematic representation of an electrochemical energy store, according to the example embodiment of the present invention, having a gel electrolyte or a solid electrolyte.

FIG. 2 shows an electrochemical energy store according to an example embodiment of the present invention, in which a solid electrolyte or a gel electrolyte is used.

By contrast to an electrochemical energy store 1, in which a liquid electrolyte 19 is used, as shown in FIG. 1, in the case of the use of a solid electrolyte 21, as shown in FIG. 2, using a separator 11 is not required. The separation of anode 5 and cathode 9 takes place by solid electrolyte 21. Also, anode 5 does not dip into solid electrolyte 21, but a layer construction is generally provided, in which anode 5, solid electrolyte 21 and cathode 9 connect to one another. According to the example embodiment of the present invention, gas chamber 13, in which the reaction of lithium with oxygen to form lithium peroxide takes place, connects to cathode 9. In the specific embodiment shown in FIG. 2, the oxygen supply also takes place by an oxygen reservoir 17, which is connected to gas chamber 13 via a valve 15. Alternatively, however, in the specific embodiment shown in FIG. 2, it is also possible that gas chamber 13 simultaneously acts as an oxygen reservoir. In this case too, the oxygen may be stored both physically and chemically.

Figure 3:
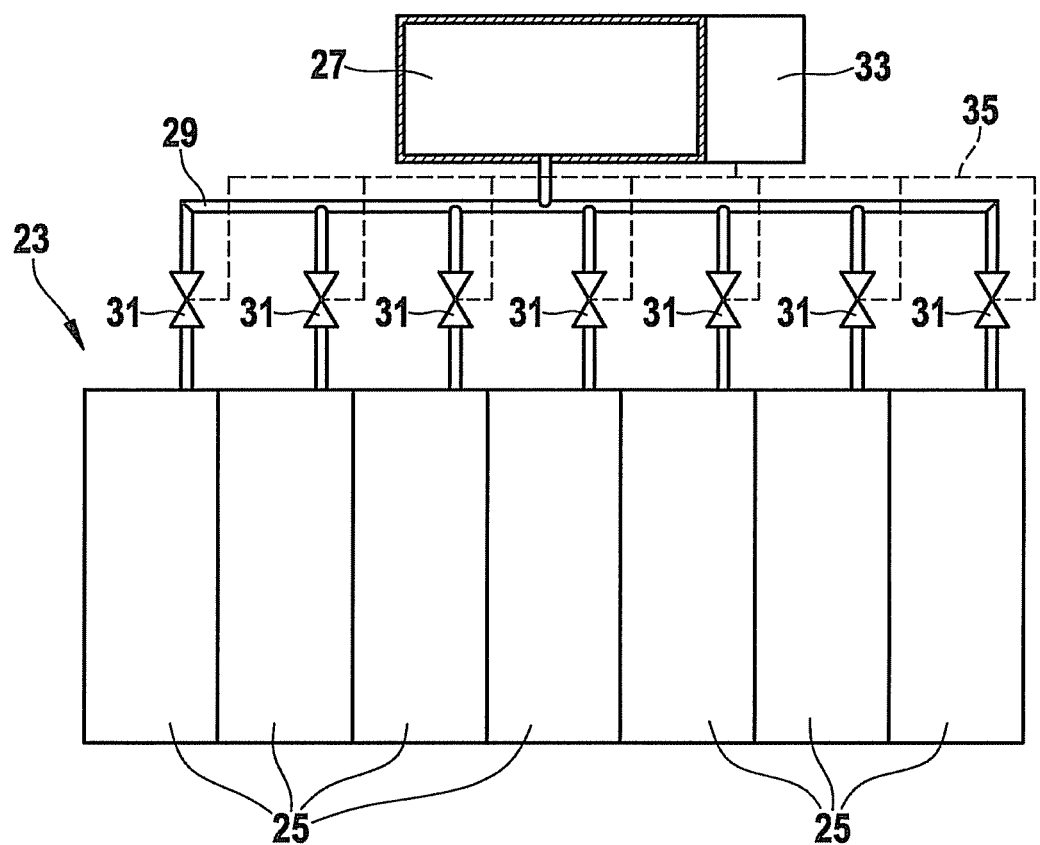
FIG. 3 shows a schematic representation of a module made up of a plurality of individual cells.

FIG. 3 shows schematically a module made up of a plurality of individual cells.

One module includes a plurality of individual cells 25. In this context, individual cells 25 correspond in each case to electrochemical energy store 1, as is shown in FIGS. 1 and 2. The oxygen supply of individual cells 25 may take place, for instance, via individual oxygen reservoirs, each individual cell 25 being connected to its own oxygen reservoir. In the specific embodiment under discussion, however, all individual cells 25 are supplied with oxygen via a common oxygen reservoir 27. For this purpose, oxygen reservoir 27 is connected to the individual cells 25 via a connection 29. The connection takes place in each case on the cathode side, in this context.

In order to be able to control the oxygen supply into individual cells 25, a valve 31 is provided before each cell in connection 29. The oxygen supply to, and the removal from individual cells 25 may be controlled via valve 31. The control of valves 31 preferably takes place via a control system 33. For this purpose, each valve 31 is connected to control system 33 via a control line 35. Besides the control of the oxygen supply or the oxygen removal via control system 33, it is also possible to ascertain the charging state of individual cells 25 and the SOH of individual cells 25, for instance, using control system 33. This is done, for example, via the pressure or the chemical potential of the oxygen in the compound, together with the cell voltage. Appropriate sensors, by which the pressure or the chemical potential is able to be taken, are conventional. Any pressure sensors or sensors for recording the chemical potential may be used, that are not attacked by the operation of the electrochemical energy store. Thus, module 23 may be ideally controlled by control system 33. The oxygen supply or the oxygen removal may also be drawn upon for the control by the activation of valves 31.

What is claimed is:

1. An electrochemical energy store, comprising:
    a plurality of cells, each including:
        an anode;
        a cathode;
        a solid electrolyte between the anode and the cathode, wherein the anode is disposed adjacent to a first side of the solid electrolyte and the cathode is disposed adjacent to a second side of the solid electrolyte that is opposite the first side so that the solid electrolyte separates completely the anode from the cathode;
        a gas chamber at least partially delineated, and separated from the anode and electrolyte, by the cathode; and
        a valve connected to the gas chamber;
    an oxygen reservoir connected to the valve of each of the plurality of cells; and
    a control system having a plurality of control lines, each connected to the valve of a respective different one of the plurality of cells to individually control an oxygen supply to the gas chamber of the respective cell.

2. The electrochemical energy store as recited in claim 1, wherein each gas chamber is bounded by a side of the cathode that is opposite a side of the cathode that is adjacent to the solid electrolyte.

3. An electrochemical energy store, comprising:
    a plurality of cells, each cell including:
        at least one anode;
        at least one cathode;

a solid electrolyte between the at least one anode and the at least one cathode, wherein the at least one anode is disposed adjacent to a first side of the solid electrolyte and the at least one cathode is disposed adjacent to a second side of the solid electrolyte that is opposite the first side so that the solid electrolyte separates completely the at least one anode from the at least one cathode;

a gas chamber delineated by the at least one cathode and at least one other chamber wall, the gas chamber separated from the at least one anode and the electrolyte by the at least one cathode; and at least one valve connected to the gas chamber;

an oxygen reservoir hermetically sealed to the gas chamber in each cell via the at least one valve of the cell; and a control system having a plurality of control lines, each connected to the at least one valve of a respective different one of the plurality of cells to provide a control signal to individually control an oxygen supply to the gas chamber of the respective cell, wherein lithium peroxide is generated at the cathode by a reaction of lithium ions with oxygen from the oxygen reservoir.

4. The electrochemical energy store as recited in claim 3, wherein each cathode is porous.

5. The electrochemical energy store as recited in claim 3, wherein each cathode includes a lattice structure which has a carrier material as a reaction surface.

6. The electrochemical energy store as recited in claim 3, wherein oxygen contained in the oxygen reservoir is bound chemically in a form of an oxygen-containing compound.

7. The electrochemical energy store as recited in claim 3, wherein oxygen contained in the oxygen reservoir is stored physically.

8. The electrochemical energy store as recited in claim 7, wherein the oxygen reservoir is an oxygen tank.

9. The electrochemical energy store as recited in claim 7, wherein the oxygen is adsorbed in a storage device.

10. The electrochemical energy store as recited in claim 7, wherein a mixture of oxygen and a gas that is inert to the electrochemical reaction is contained in the oxygen reservoir.

11. The electrochemical energy store as recited in claim 10, wherein the gas that is inert to the electrochemical reaction is nitrogen.

12. The electrochemical energy store as recited in claim 3, wherein each anode contains metallic lithium.

13. The electrochemical energy store as recited in claim 3, further comprising:

a pressure sensor for each cell, the pressure sensor connected to the control system, wherein the control system determines a charging state of each cell based on a pressure from the respective pressure sensor and controls the oxygen supply to the gas chamber as a function of the determined charging state.

14. The electrochemical energy store as recited in claim 3, further comprising:

a chemical potential sensor for each cell, the chemical potential sensor connected to the control system, wherein the control system determines a state of health of each cell based on a potential from the respective chemical potential sensor and controls the oxygen supply to the gas chamber as a function of the determined state of health.

15. The electrochemical energy store as recited in claim 3, wherein each valve further controls removal of oxygen from the gas chamber.

16. The electrochemical energy store as recited in claim 3, wherein the control system individually controls the oxygen supply to the gas chamber of each cell as a function of a charging state of the cell.

17. The electrochemical energy store as recited in claim 16, wherein the control system determines the charging state of the cell as a function of at least one of: a voltage of the cell, a chemical potential of the cell, or a pressure of the cell.

18. The electrochemical energy store as recited in claim 16, further comprising a sensor to provide the at least one of the voltage of the cell, the chemical potential of the cell or the pressure of the cell.

19. The electrochemical energy store as recited in claim 3, wherein the control system individually controls the oxygen supply to the gas chamber of each cell as a function of a state of health of the cell.

20. The electrochemical energy store as recited in claim 3, wherein each gas chamber is bounded by a side of the cathode that is opposite a side of the cathode that is adjacent to the solid electrolyte.

* * * * *